US009332446B2

(12) United States Patent
Nagaraja et al.

(10) Patent No.: US 9,332,446 B2
(45) Date of Patent: May 3, 2016

(54) SELF-CONFIGURATION OF A PHYSICAL CELL IDENTITY (PCI) AT A CELL

(71) Applicant: QUALCOMM Incorporated, San Diego, CA (US)

(72) Inventors: Sumeeth Nagaraja, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/618,850

(22) Filed: Feb. 10, 2015

(65) Prior Publication Data
US 2015/0304862 A1 Oct. 22, 2015

Related U.S. Application Data

(60) Provisional application No. 61/981,102, filed on Apr. 17, 2014.

(51) Int. Cl.
*H04M 3/00* (2006.01)
*H04W 24/02* (2009.01)
*H04W 84/04* (2009.01)
*H04W 92/20* (2009.01)

(52) U.S. Cl.
CPC ............ *H04W 24/02* (2013.01); *H04W 84/045* (2013.01); *H04W 92/20* (2013.01)

(58) Field of Classification Search
CPC ................................ H04W 28/00; H04W 8/22
USPC ........... 370/241, 328, 254; 455/418, 436–444
See application file for complete search history.

(56) References Cited

U.S. PATENT DOCUMENTS

| 8,494,526 B2 | 7/2013 | Kallin et al. |
| 2009/0129291 A1 | 5/2009 | Gupta et al. |

(Continued)

FOREIGN PATENT DOCUMENTS

| EP | 2 273 816 A1 | 1/2011 |
| EP | 2 320 693 A1 | 5/2011 |

(Continued)

OTHER PUBLICATIONS

Abdullah L.M., et al., "Self-configuration Concept to Solve Physical Cell ID Conflict for SON LTE-based Femtocell Environment," International Journal on. Recent Trends in Engineering & Technology, Jan. 2014, vol. 10 (2), pp. 165-171, URL: <http://searchdl.org/public/journals/2014/IJRTET/10/2/1392.pdf>.

(Continued)

*Primary Examiner* — Charles Shedrick
(74) *Attorney, Agent, or Firm* — Arent Fox LLP

(57) ABSTRACT

The present disclosure presents a method and an apparatus for self-configuring a physical cell identify (PCI) at a cell upon detecting a PCI confusion at a neighbor cell. For example, the method may include detecting that a PCI confusion exists at a second cell based on a message (e.g., configuration update message or a X2 setup response message) received from the second cell. The first cell may initiate a timer that is selected from a first timer and a second timer, the first timer longer in duration than the second timer. The first cell then configures a new PCI for the first cell when the timer expires or maintains a current PCI for the first cell when the timer is reset prior to expiration. As such, self-configuration of PCI at a cell may be achieved.

34 Claims, 11 Drawing Sheets

(56) References Cited

U.S. PATENT DOCUMENTS

| | | |
|---|---|---|
| 2010/0227603 A1 | 9/2010 | Gupta et al. |
| 2011/0159901 A1* | 6/2011 | Frenger ................ H04L 5/0082 455/502 |
| 2012/0040674 A1* | 2/2012 | McGilly ........... H04W 36/0066 455/436 |
| 2012/0213089 A1* | 8/2012 | Shi ........................ H04L 5/001 370/241 |
| 2013/0089029 A1 | 4/2013 | Jang et al. |
| 2013/0337794 A1 | 12/2013 | Kojima |
| 2014/0213267 A1* | 7/2014 | Chai .................. H04W 76/028 455/450 |
| 2015/0045038 A1* | 2/2015 | Gao ..................... H04W 36/22 455/438 |

FOREIGN PATENT DOCUMENTS

| | | |
|---|---|---|
| WO | WO-2010/020293 A1 | 2/2010 |
| WO | WO-2011/023234 A1 | 3/2011 |

OTHER PUBLICATIONS

International Search Report and Written Opinion—PCT/US2015/025727—ISA/EPO—Jul. 14, 2015. (14 total pages).

Nokia Siemens Networks et al: "SON Use Case: Cell Phy_ID Automated Configuration", 3GPP Draft; R3-080376 (PHYID Autoconf), 3rd Generation Partnership Project (3GPP), Mobile Competence Centre; 650, Route Des Lucioles ; F-06921 Sophia-Antipolis Cedex ; France, vol. RAN WG3, no. Sorrento, Italy; Feb. 5, 2008, XP050163582, [retrieved on Feb. 5, 2008].

Qualcomm Europe et al., "Framework for distributed PCI selection", 3GPP Draft; R3-082228, 3rd Generation Partnership Project (3GPP), Mobile Competence Centre; 650 Route Des Lucioles; F-06921 Sophia-Antipolis Cedex; France, vol. RAN WG3, no. Jeju Island; Aug. 25, 2008, XP050165269, [retrieved on Aug. 25, 2008] the whole document.

* cited by examiner

SELF-CONFIGURATION OF A PHYSICAL CELL IDENTITY (PCI) AT A CELL

CLAIM OF PRIORITY UNDER 35 U.S.C. §119

The present application for patent claims priority to U.S. Provisional Application No. 61/981,102, filed Apr. 17, 2014, entitled "Time Offset-Based Self-Configuration at Small Cell Upon Detecting a Conflict," assigned to the assignee hereof and hereby expressly incorporated by reference herein.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In some instances, there may be configuration conflicts between different cells in a wireless communication network. This may trigger self-configuration procedures at several of the cells, which may not only be wasteful and sub-optimal, but may also impact the behavior of other cells. For example, there may be a physical cell identity (PCI) confusion at a cell. PCI confusion occurs when two neighbors of a cell are configured with the same PCI.

In view of the foregoing, it may be understood that there may be significant problems and shortcomings associated with current self-configuration procedures when configurations problems exist.

SUMMARY OF THE DISCLOSURE

Aspects of the present disclosure relate generally to self-configuration procedures in wireless communications, and more particularly, self-configuring a physical cell identity (PCI) at a cell upon detecting a PCI confusion at a neighbor cell.

The present disclosure presents an example method and apparatus for self-configuring a physical cell identity (PCI) at a cell. For example, in an aspect, the present disclosure presents an example method that may include detecting, at a first cell, that a PCI confusion exists at a second cell based on a message received from the second cell, wherein the message is a configuration update message or a X2 setup response message, initiating a timer that is selected from a first timer and a second timer, the first timer longer in duration than the second timer, and configuring a new PCI for the first cell when the timer expires or maintaining a current PCI for the first cell when the timer is reset prior to expiry.

Additionally, the present disclosure presents an example apparatus for self-configuring a physical cell identity (PCI) at a cell that may include means for detecting, at a first cell, that a PCI confusion exists at a second cell based on a message received from the second cell, wherein the message is a configuration update message or a X2 setup response message, means for initiating a timer that is selected from a first timer and a second timer, the first timer longer in duration than the second timer, and means for configuring a new PCI for the first cell when the timer expires or maintaining a current PCI for the first cell when the timer is reset prior to expiry.

In a further aspect, the present disclosure presents an example non-transitory computer readable medium storing computer executable code for self-configuring a physical cell identity (PCI) at a cell that may include for detecting, at a first cell, that a PCI confusion exists at a second cell based on a message received from the second cell, wherein the message is a configuration update message or a X2 setup response message, initiating a timer that is selected from a first timer and a second timer, the first timer longer in duration than the second timer, and configuring a new PCI for the first cell when the timer expires or maintaining a current PCI for the first cell when the timer is reset prior to expiry.

Furthermore, in an aspect, the present disclosure presents an example apparatus for apparatus for configuring a physical cell identity (PCI) at a cell that may include a PCI confusion detection component to detect, at a first cell, that a PCI confusion exists at a second cell based on a message received from the second cell, wherein the message is a configuration update message or a X2 setup response message, a timing component to initiate a timer that is selected from a first timer and a second timer, the first timer longer in duration than the second timer, and a configuration component to configure of a new PCI for the first cell when the timer expires or maintaining a current PCI for the first cell when the timer is reset prior to expiry.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
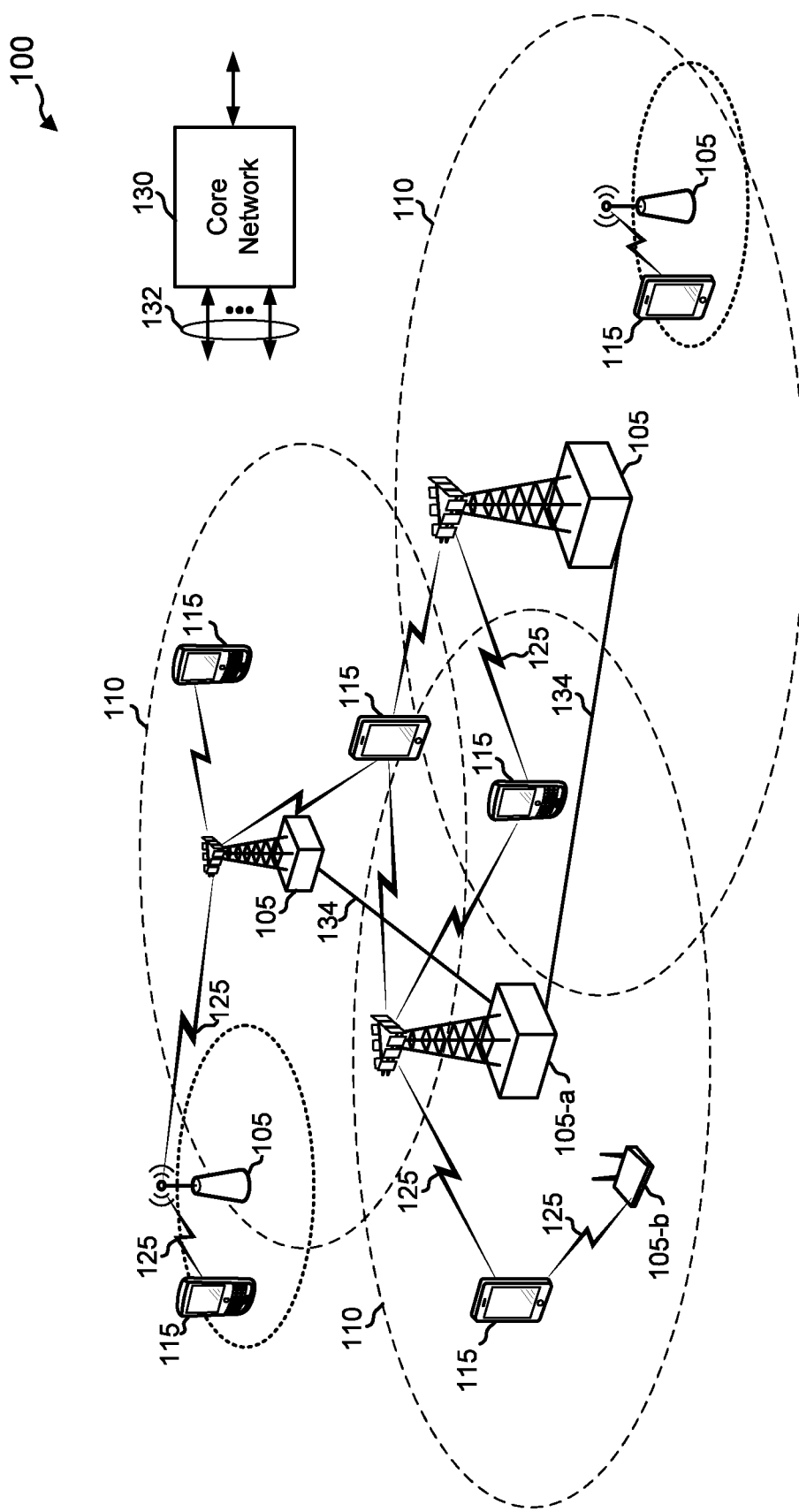
FIG. 1 is a block diagram conceptually illustrating an example of a wireless communications system, in accordance with an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the approach described herein may apply when deployment of cells (for example macro, pico, small cells, access point, etc) in a given region/spectrum can communicate with neighbors (e.g., other cells) over wired/wireless backhaul/X2. A cell may generally send an X2 eNodeB configuration update, a broadcast message, to all neighbors to notify a configuration change (e.g., a change in neighbor list (NL)). The message can even be proprietary. In some scenarios, a configuration update message may indicate or trigger more than one cell to re-run certain procedures to select a different configuration. Triggering self-configuration procedure at multiple cells may be wasteful of resources and sub optimal, and may cause ripple effects where other cells may get impacted. On the other hand, it may be sufficient for one of the cells to react to the eNodeB configuration update message and self-configure.

Methods and apparatus are described in which a first cell (e.g., a small cell or a macro cell) may identify a first timer and a second timer, where the first timer is longer in duration than the second timer. The first cell may receive a message that indicates a physical cell identity (PCI) confusion between the first cell and another cell. The first cell may select a timer (e.g., the first timer or the second timer) in response to the detection. A timer may be initiated based on the timer selected by the first cell and a new PCI may be selected for the first cell when the timer expires.

A small cell or a small cell base station or access point may refer, but is not limited to, a femtocell, picocell, microcell, or any other cell or base station having a relatively small transmit power or relatively small coverage area as compared to a macro cell or macro base station.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with an aspect of the present disclosure. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various aspects. The base stations 105 may communicate control information and/or user data with the core network 130 through first backhaul links 132. In aspects, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time (e.g., cellular and Wi-Fi or wireless local area networks (WLANs)).

The base stations 105 may wirelessly communicate with the UEs 115 via one or more base station antennas. Each of the base stations 105 sites may provide communication coverage for a respective geographic coverage area 110. In some aspects, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In aspects, the wireless communications system 100 is an LTE/LTE-A network communication system. In LTE/LTE-A network communication systems, the terms evolved NodeB (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area (e.g., buildings) and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115. A small cell may refer to a micro cell, a pico cell, or a femto cell, for example.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a wireless network appliance (e.g., devices for Internet of Things (IoT)), or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain examples, an eNodeB 105 may correspond to a cell and may be configured to perform functions that enable self-configuring a PCI upon detecting PCI confusion at a neighbor cell. This approach allows for conflicting cells to resolve the issue at different times, with one of the cells being given priority (e.g., the latest cell to enter the network) to select a new configuration and the other cell having the opportunity to make a similar determination at some later time. An eNodeB (or cell) may be configured or may be operable to identify a first timer and a second timer, where the first timer is longer in duration than the second timer. A cell may receive a configuration update message or a X2 setup response message that may indicate a conflict in PCI between two cells (e.g., small cells or macro cells). The cell may select a timer from the first timer and the second timer in response to the detection of PCI confusion via the configuration update message or the X2 setup response message. A timer may be initiated or started based on the timer selected by the cell and a new PCI may be selected for the cell when the timer expires.

Figure 2:
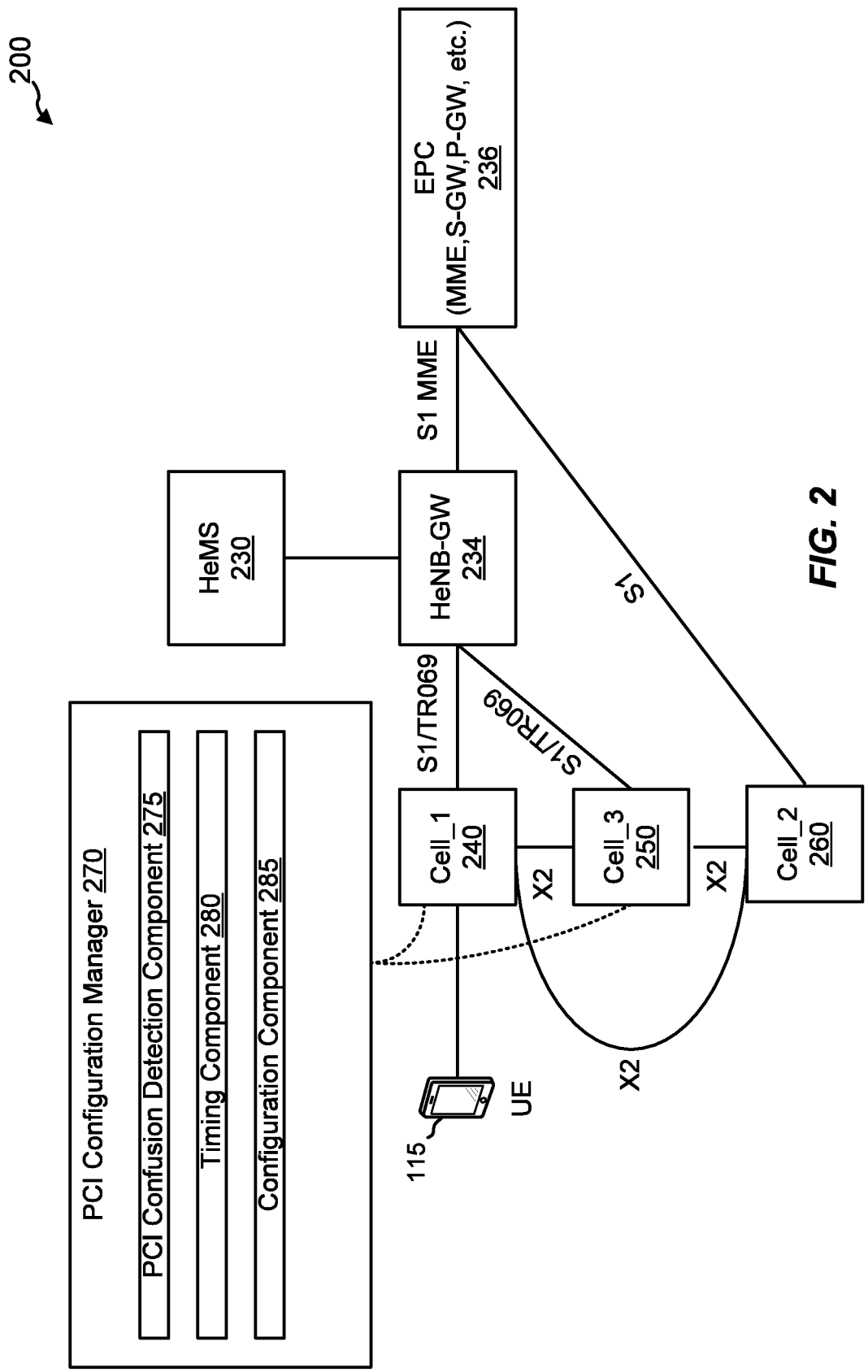
FIG. 2 is a block diagram conceptually illustrating an example of a network architecture, in accordance with an aspect of the present disclosure.

FIG. 2 is a block diagram conceptually illustrating an example of a network architecture 200, in accordance with an aspect of the present disclosure. The network architecture 200 may be part of the wireless communications system 100 of FIG. 1, and may include a home eNodeB management system (HeMS 230) capable of handling operation, administration, and management (OAM) for small cell base stations in a home network. The network architecture 200 may also include a home eNodeB gateway (HeNB-GW) 234, an evolved packet core (EPC) 236, cells 240 (Cell_1 which may be configured with a PCI value of PCI_1) and 250 (Cell_3, e.g., a new cell being added as described below) in communication with the HeNB-GW 234 via an S1/TR069 interface, cell 260 (Cell_2 which may be configured with a PCI value of PCI_2) in communication with EPC 236 via an S1 interface, and a UE 115 in communication with Cell_1. The HeNB-GW 234 and the EPC 236 may communicate via an S1 mobility management entity (MME) interface. The cells of FIG. 2 may correspond to some of the cells/base stations described above with respect to FIG. 1.

Cells 240 and 250 (Cell_1 and Cell_3) may be small cells generally controlled via HeNB-GW 234 and cell 260 (Cell_2) may be a macro cell generally controlled via EPC 236. Cells 240 and 250 may be configured to receive and/or store a first timer and a second timer provided by the HeMS 230 or hardcoded into each of the cells. Each of the cells 240 and 250 may include a PCI configuration manager 270 that may configure a physical cell identity (PCI) at a cell, e.g., cells 240 and/or 250, by using different timers to stagger the time at which cells causing PCI confusion at a common neighbor cell (e.g., cell 260) perform self-configuration of PCI to resolve the PCI confusion by configuring a different PCI at one of the cells. The PCI configuration manager 270 may include a PCI confusion detection component 275, a timing component 280, and/or a configuration component 285.

The PCI confusion detection component 275 may include hardware, software, or a combination of hardware and software and may be configured or be operable to detect, at a first cell (e.g., Cell_1 or Cell_3), that a PCI confusion exists at a second cell (e.g., Cell_2) based on a configuration update message received from the second cell (Cell_2). The timing component 280 may include hardware, software, or a combination of hardware and software and may be configured or be operable to initiate a timer which is selected from a first timer and a second timer. The first timer may be longer in duration than the second timer.

The self configuration component 285 may include hardware, software, or a combination of hardware and software and may be configured or operable to initiate configuring of a new PCI (e.g., PCI_3) for the first cell (Cell_3) when the timer expires (e.g., second timer) or maintaining a current PCI (PCI_2) for the first cell (Cell_3) when the timer (e.g., first timer) is reset prior to expiration.

The timing component 285 may select between the first timer and the second timer based on a comparison between a threshold time value and one of a time from reboot of the first cell and a time from establishing an X2 connection by the first cell. When the time is greater than the threshold time value, the first timer may be selected, and when the time is less than the threshold time value, the second timer may be selected. Similarly, the timing component 285 may select between the first timer and the second timer based on a comparison between a threshold power value and a transmission power of the first cell. When the transmission power (e.g., cell coverage area) is greater than the threshold power value, the first timer may be selected, and when the transmission power is less than the threshold power value, the second timer may be selected.

Figure 3:
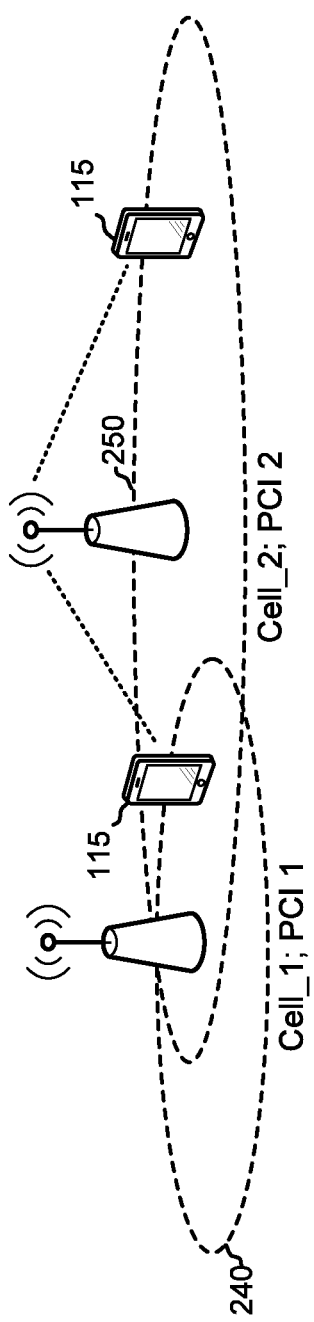
FIG. 3 is a block diagram conceptually illustrating an example of a two-cell network architecture, in accordance with an aspect of the present disclosure.

FIG. 3 is a block diagram conceptually illustrating an example of a two-cell network architecture 300, in accordance with an aspect of the present disclosure. The two-cell network architecture 300 may correspond to a portion of the network architecture 200 of FIG. 2 and is provided by way of illustration of a scenario in which self-configuration of a small cell upon detection of PCI confusion may be used.

In FIG. 3, Cell_1 (cell 240 of FIG. 2), which in this example is a small cell, selects PCI 1 and Cell_2 (cell 250 of FIG. 2), which in this example is a macro cell, selects PCI 2. The coverage area of these two cells (Cell_1 and Cell_2) is also shown. In addition, there are two UEs 115 which are in RRC_CONNECTED mode with Cell_2. In this scenario, the neighbor list (NL) of Cell_1 contains Cell_2 and the neighbor list of Cell_2 contains Cell_1. Both cells can exchange information over an X2 interface (not shown). Therefore, each of Cell_1 and Cell_2 knows the configuration (e.g., PCI) of the other cell and there is no PCI conflict between the two cells as their configurations are different (e.g., different PCIs).

Figure 4:
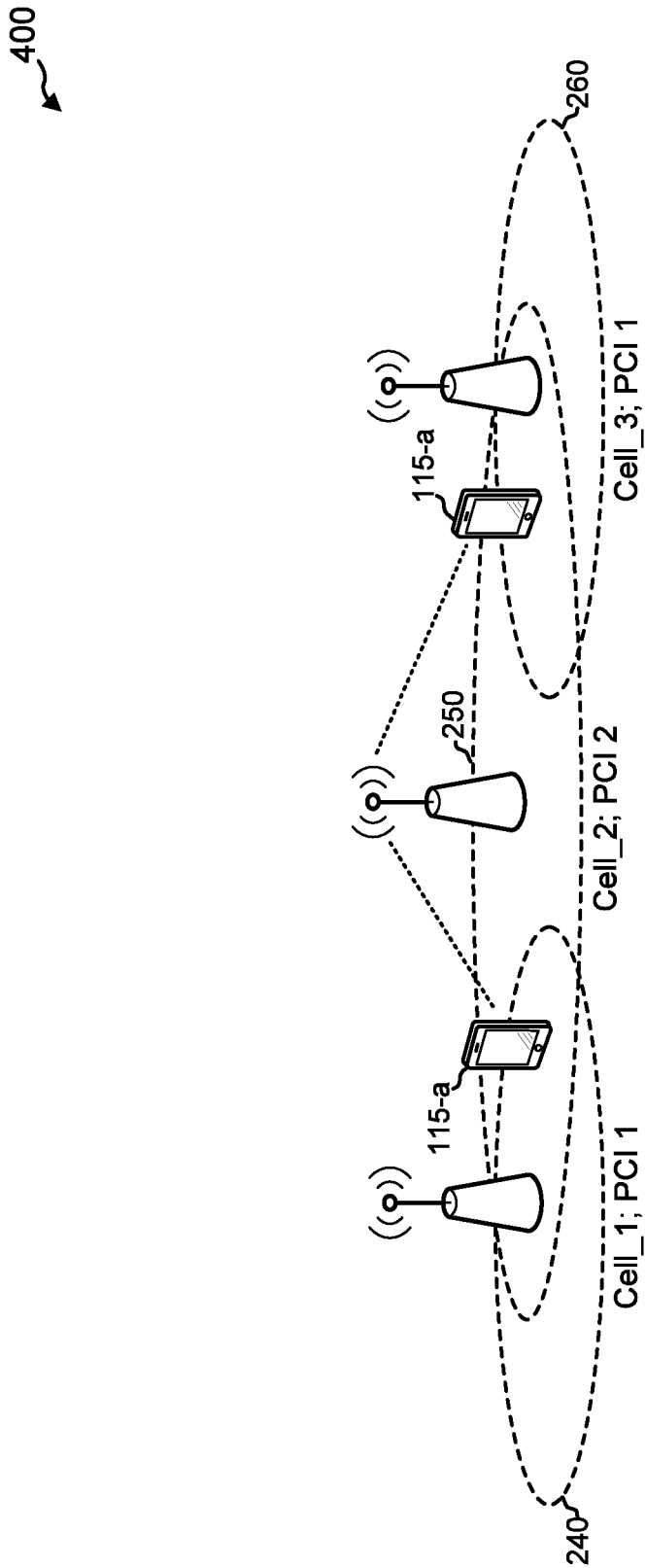
FIG. 4 is a block diagram conceptually illustrating an example of a three-cell network architecture, in accordance with an aspect of the present disclosure.

FIG. 4 is a block diagram conceptually illustrating an example of a three-cell network architecture 400, in accordance with an aspect of the present disclosure. The three-cell network architecture 300 may correspond to a portion of the network architecture 200 of FIG. 2 and is provided by way of illustration, along with the two-cell network architecture 300, of a scenario in self-configuration of a small cell upon detection of PCI confusion may be used.

In FIG. 4, a new cell, Cell_3 (cell 260 of FIG. 2) is added to the network. Cell_3 may perform an initial scan and may select PCI 1 (since Cell_3 does not detect a signal from Cell_1 and is not aware that Cell_1 is already configured with PCI 1) for configuration. In addition, Cell_3 may detect a signal from Cell_2, via UE automatic neighbor relations (ANR) or neighbor list (NL). Cell_3 may then send an X2 setup message to Cell_2 and Cell_2 may respond with an X2 setup response message. The X2 setup response message contains Cell_2 neighbor list, which includes information about Cell_1 as Cell_1 is a neighbor of Cell_2 with overlapping coverage. At this point, Cell_3 identifies that there is PCI confusion at Cell_2 because both Cell_1 and Cell_3 are configured with the same PCI (e.g., PCI 1). An X2 connection is now established between Cell_3 and Cell_2, and immediately following establishment of the X2 connection, Cell_2 may send an X2 configuration update message to all its neighboring cells (e.g., Cell_1 and Cell_3). This configuration update message contains the neighbor list for Cell_2. Upon receiving this message, both Cell_1 and Cell_3 identify that PCI confusion exists at Cell_2 as Cell_1 and Cell_3 are configured with the same PCI (e.g., PCI 1).

Given that PCI confusion detection occurs nearly at the same time at Cell_1 and Cell_3, it may be beneficial for one of the cells to change its PCI configuration. It can be either Cell_1 or Cell_3, based on some type of prioritization. In an aspect, one approach is to have one of the cells in the example of FIG. 4 change its configuration which may involve having an HeMS (e.g., HeMS 230 or OAM associated with it) via TR 196 (TR 069 interface) provide two timers (e.g., first timer, second timer) to the cells (e.g., Cell_1 and Cell_3). In an additional aspect, the first timer is longer in duration than the second timer. In an additional or optional aspect, the timers may be hardcoded at the cells.

In an aspect, upon identifying the PCI confusion, Cell_1 (which has already been in the network and is aware of network configuration before and after Cell_3 is added to the network) starts a timer based on the first timer (e.g., long timer). On the other hand, Cell_3 (which has been added newly into the network) starts a timer based on the second timer (e.g., short timer). When the timer expires, the cell reselects its configuration (e.g., PCI and/or other data). In this example, Cell_3 may reselect its configuration first because of the shorter timer. Thus, Cell_3 reselects a new PCI (different from Cell_2 and Cell_1, e.g., PCI 3) and establishes an X2 connection with Cell_2. Once the new PCI value is selected by Cell_3, Cell_2 adds Cell_3 to its neighbor list and sends an X2 configuration update message to its neighbors. With Cell_1 and Cell_3 having different PCIs (e.g., configurations), Cell_1 can reset its timer (e.g., long timer) since there is no longer PCI confusion at Cell_2. In other words, the new configuration update message indicates that the PCI confusion has been resolved with Cell_3 self-configuring to a new PCI different from the one for Cell_1.

Figure 5:
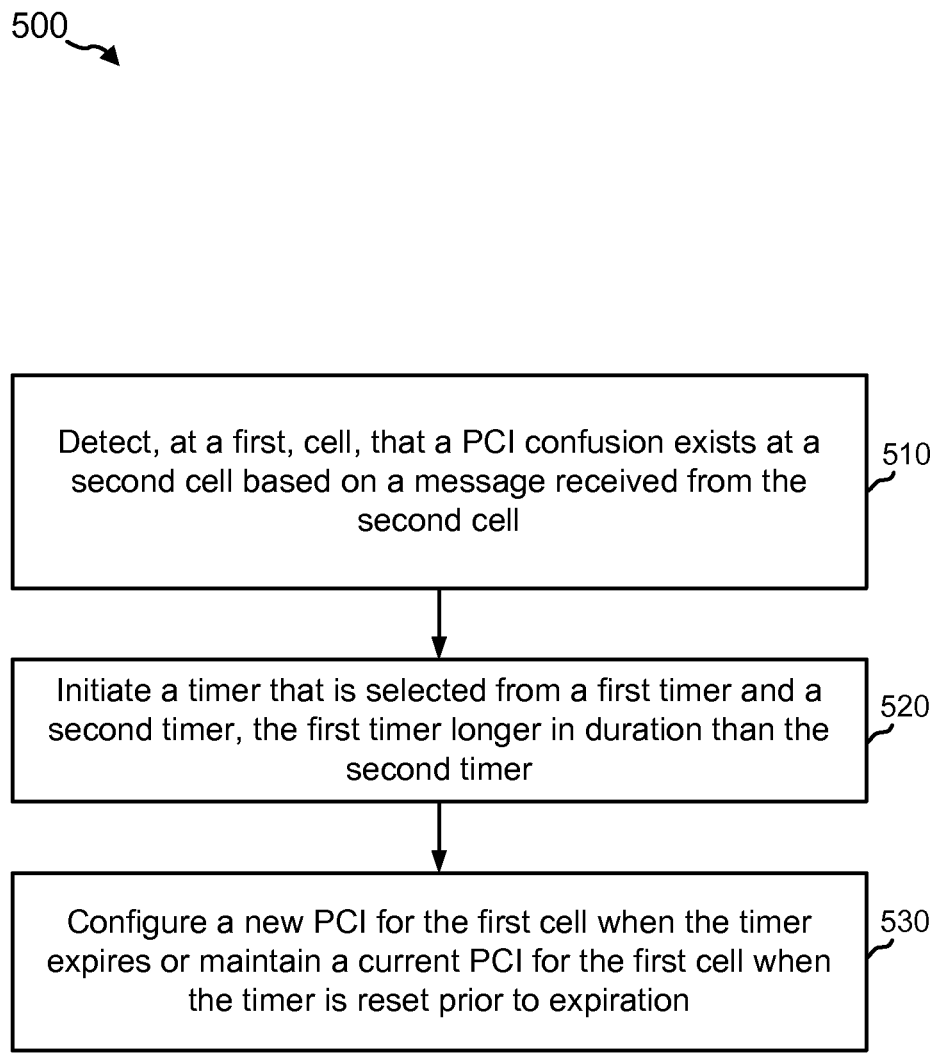
FIG. 5 is a flowchart illustrating a method for time self-configuring at a cell, in accordance with an aspect of the present disclosure.

FIG. 5 is a flowchart illustrating a method 500 for self-configuring a physical cell identity (PCI) at a cell. In an aspect, at block 510, methodology 500 may include detecting, at a first cell, that a PCI confusion exists at a second cell based on a message received from the second cell. For instance, the message may be a configuration update message or a X2 setup response message. For example, in an aspect Cell_3 260 and/or PCI configuration manager 270 may include a specially programmed processor module, or a processor executing specially programmed code stored in a memory, to detect at Cell_3 260 that a PCI confusion exists at Cell_2 based on a configuration update message received from the Cell_2.

In an aspect, at block 520, methodology 500 may include initiating a timer that is selected from a first timer and a second timer, the first timer longer in duration than the second timer. For example, in an aspect Cell_3 260 and/or PCI configuration manager 270 may include a specially programmed processor module, or a processor executing specially programmed code stored in a memory, to initiate a timer, for example, a second timer, at Cell_3 260. In an aspect, Cell_3 260 may have selected the second timer (e.g., short timer) as Cell_3 260 has been newly configured in the network.

In an aspect, Cell_3 260 may select the timer based on the duration the current PCI (e.g., PCI_1) is in use by Cell_3 260. For example, Cell_3 260 may compare the time from reboot of Cell_3 260 to a threshold time value and select the second timer (e.g., short timer) as the timer when the time from reboot of Cell_3 260 is less than the threshold time value or select the first timer (e.g., long timer) as the timer when the time from reboot of Cell_3 260 is greater than the threshold time value. In an additional aspect, the time since the current PCI is in use at a cell may also be used for selecting the timer.

In an additional aspect, the information on the timers may be received from HeMS 230 or hardcoded at the cells which then read at the time of initialization or reboot.

In an aspect, at block 530, methodology 500 may include configuring a new PCI for the first cell when the timer expires or maintaining a current PCI for the first cell when the timer is reset prior to expiration. For example, in an aspect Cell_3 260 and/or PCI configuration manager 270 may include a specially programmed processor module, or a processor executing specially programmed code stored in a memory, to configure a new PCI (e.g., PCI_3) for Cell_3 260 when the second timer (e.g., short timer) expires. In an additional or optional aspect, Cell_3 260 may maintain a current PCI (e.g., PCI_1) for Cell_3 when the timer (e.g., first timer, long term) is reset prior to expiration of the first timer. This occurs when Cell_3 has been in the network for a while when compared to Cell_1 220, which together cause a PCI confusion at Cell_2 240.

Figure 6:
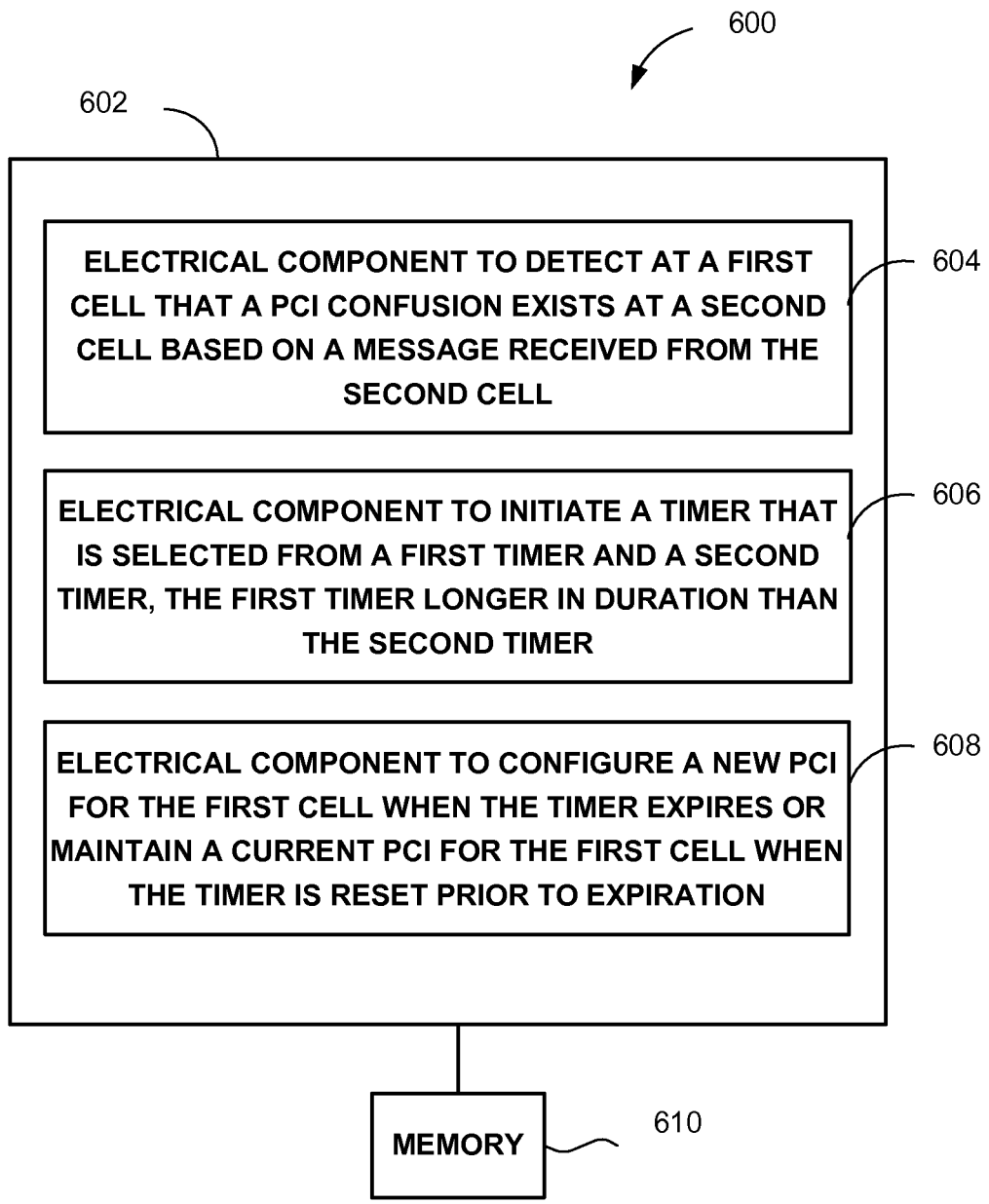
FIG. 6 illustrates an example system 600 for self-configuring a physical cell identity (PCI) at a cell.

Referring to FIG. 6, an example system 1300 is displayed for self-configuring a physical cell identity (PCI) at a cell.

For example, system 600 can reside at least partially within a cell, for example, cells 240, 250, and/or 260 (FIG. 2) and/or PCI configuration manager 260 (FIG. 2). It is to be appreciated that system 600 is represented as including functional blocks, which can be functional blocks that represent functions implemented by a processor, software, or combination thereof (for example, firmware). System 600 includes a logical grouping 602 of electrical components that can act in conjunction. For instance, logical grouping 602 may include an electrical component 604 to detect, at a first cell, that a PCI confusion exists at a second cell based on a message (e.g., configuration update message or X2 setup response message) received from the second cell. For example, in an aspect, electrical component 604 may comprise PCI configuration manager 270 (FIG. 2) and/or PCI confusion detection component 275 (FIG. 2).

Additionally, logical grouping 602 may include an electrical component 606 to initiate a timer that is selected from a first timer and a second timer, the first timer longer in duration than the second timer. For example, in an aspect, electrical component 606 may comprise PCI configuration manager 270 (FIG. 2) and/or timing component 280 (FIG. 2).

Further, logical grouping 602 may include an electrical component 608 to configure a new PCI for the first cell when the timer expires or maintaining a current PCI for the first cell when the timer is reset prior to expiration. For example, in an aspect, electrical component 608 may comprise PCI configuration manager 270 (FIG. 2) and/or configuration component 285 (FIG. 2).

Additionally, system 600 can include a memory 610 that retains instructions for executing functions associated with the electrical components 604, 606, and 608, stores data used or obtained by the electrical components 604, 606, and 608, etc. While shown as being external to memory 610, it is to be understood that one or more of the electrical components 604, 606, and 608 can exist within memory 610. In one example, electrical components 604, 606, and 608 can comprise at least one processor, or each electrical component 604, 606, and 608 can be a corresponding module of at least one processor. Moreover, in an additional or alternative example, electrical components 604, 606, and 608 can be a computer program product including a computer readable medium, where each electrical component 604, 606, and 608 can be corresponding code.

Figure 7:
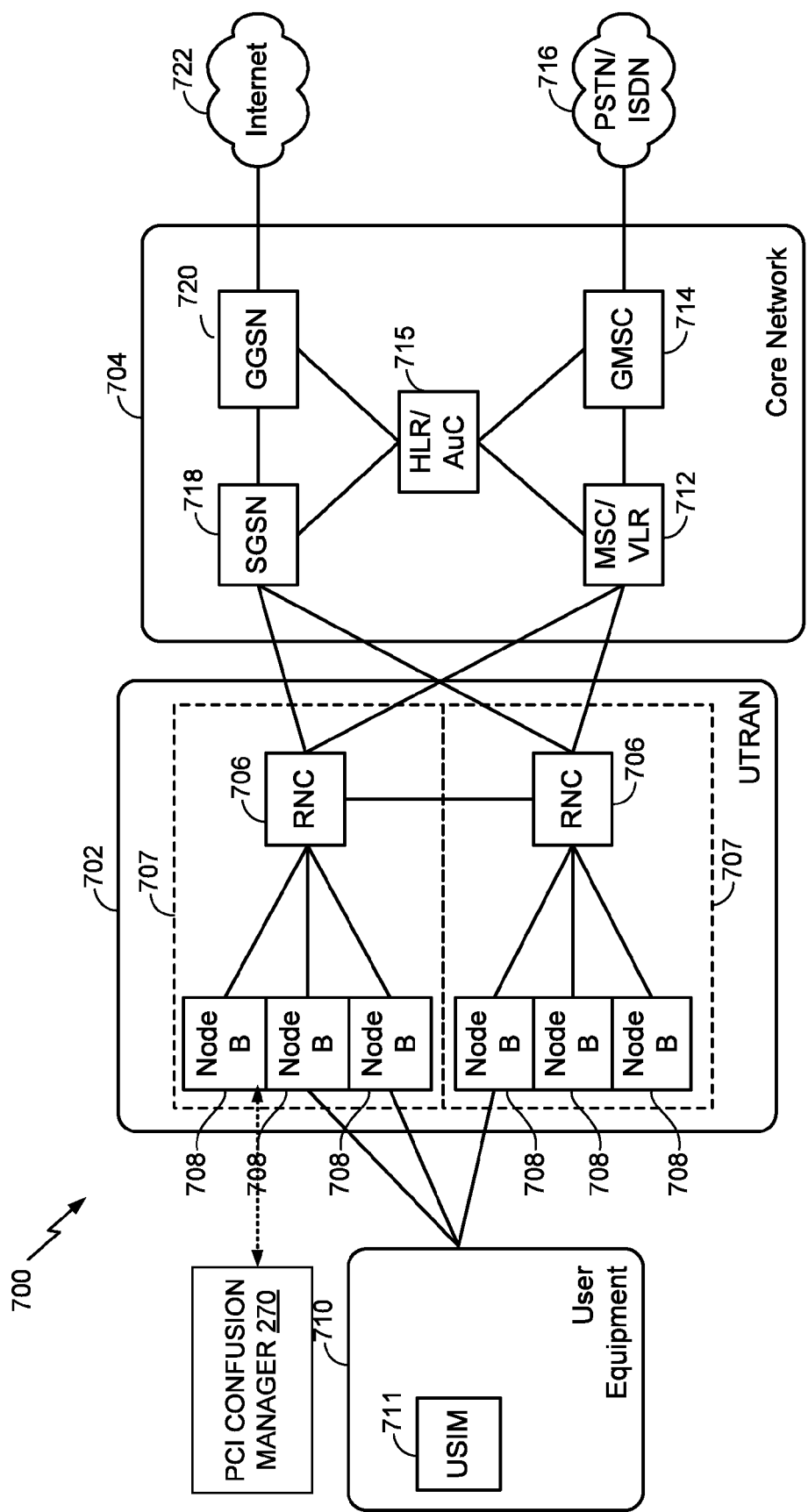
FIG. 7 is a block diagram conceptually illustrating an example of a telecommunications system, including aspects of the system of FIG. 1.

FIG. 7 is a block diagram conceptually illustrating an example of a telecommunications system, including aspects of the system of FIG. 1. By way of example and without limitation, the aspects of the present disclosure illustrated in FIG. 7 are presented with reference to a UMTS system 700 employing a W-CDMA air interface and may include cell_3 250 executing an aspect of PCI configuration manager 270 of FIG. 2. The networks described above that include cells having a PCI configuration manager 270 may be part of or may be associated with a system such as UMTS system 700. A UMTS network includes three interacting domains: a Core Network (CN) 704 (which may be an example of the EPC 236 of FIG. 2), a UMTS Terrestrial Radio Access Network (UTRAN) 702, and User Equipment (UE) 710 (which may be an example of UE 115 of FIG. 1). In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a NodeB 708 may be considered as including a physical (PHY) layer and a medium access control (MAC) layer. Further, communication between a UE 710 and an RNC 706 by way of a respective NodeB 708 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in Radio Resource Control (RRC) Protocol Specification, 3GPP TS 25.331 v9.1.0, incorporated herein by reference.

The geographic region covered by the SRNS 707 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 708 are shown in each SRNS 707; however, the SRNSs 707 may include any number of wireless NodeBs. The NodeBs 708 provide wireless access points to a core network (CN) 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 711, which contains a user's subscription information to a network. For illustrative purposes, one UE 710 is shown in communication with a number of the NodeBs 208. The downlink (DL), also called the forward link, refers to the communication link from a NodeB 708 to a UE 710, and the uplink (UL), also called the reverse link, refers to the communication link from a UE 710 to a NodeB 708.

The core network 704 interfaces with one or more access networks, such as the UTRAN 702. As shown, the core network 704 is a GSM core network. However, as those skilled in the art will recognize, the various concepts presented throughout this disclosure may be implemented in a RAN, or other suitable access network, to provide UEs with access to types of core networks other than GSM networks.

The core network 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a visitor location register (VLR) that contains subscriber-related information for the duration that a UE is in the coverage area of the MSC 712. The GMSC 714 provides a gateway through the MSC 712 for the UE to access a circuit-switched network 716. The core network 704 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The core network 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a NodeB 708 and a UE 710. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 8:
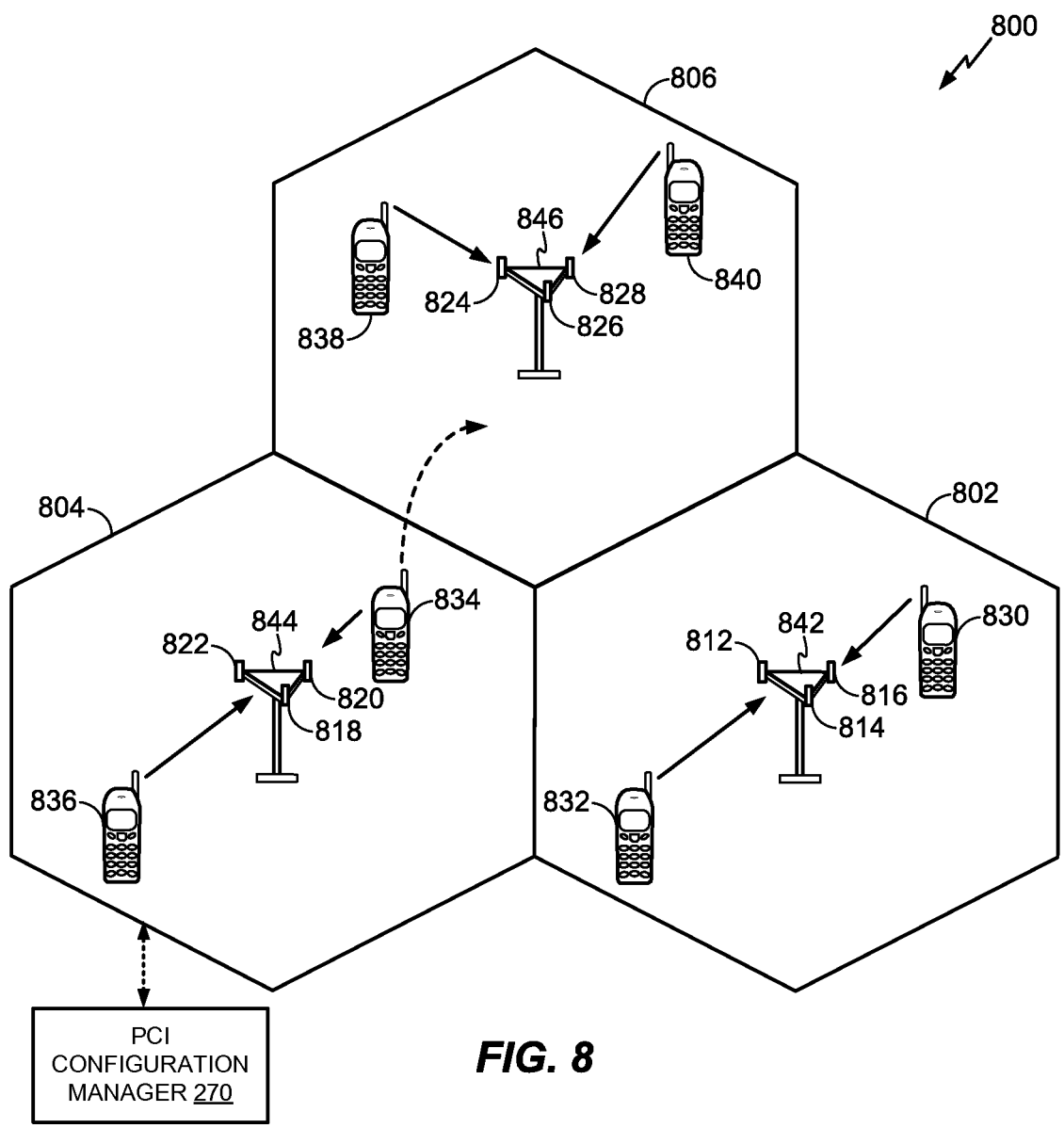
FIG. 8 is a conceptual diagram illustrating an example of an access network for use with a UE, in accordance with an aspect of the present disclosure.

Referring to FIG. 8, an access network 800 in UTRAN architecture is illustrated, and may include cells 802, 804, and 806, which be the same as or similar to cell_3 250 (FIG. 2) in that they are configured to include PCI configuration manager 270 (FIG. 2; for example, illustrated here as being associated with cell 804) for self-configuring a PCI upon detection of PCI confusion at a neighboring cell. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with NodeB 842, UEs 834 and 836 may be in communication with NodeB 844, and UEs 838 and 840 can be in communication with NodeB 846. Here, each NodeB 842, 844, 846 is configured to provide an access point to a CN 804 (see FIG. 8) for all the UEs 830, 832, 834, 836, 838, 840 in the respective cells 802, 804, and 806. UEs 830, 832, 834, 836, 838, and 840 may be similar to UE 115, described above, and NodeBs 842, 844, and/or 846 can correspond to one or more of the macro cells and/or small cells described in, for example, FIGS. 1-4.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the NodeBs corresponding to the respective cells, at a radio network controller 206 (see FIG. 8), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel (DPCH) or fractional downlink dedicated physical channel (F-DPCH) to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA;

and Evolved UTRA (E-UTRA), Ultra Mobile Broadband (UMB), and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system is presented below with reference to FIG. 9.

Figure 9:
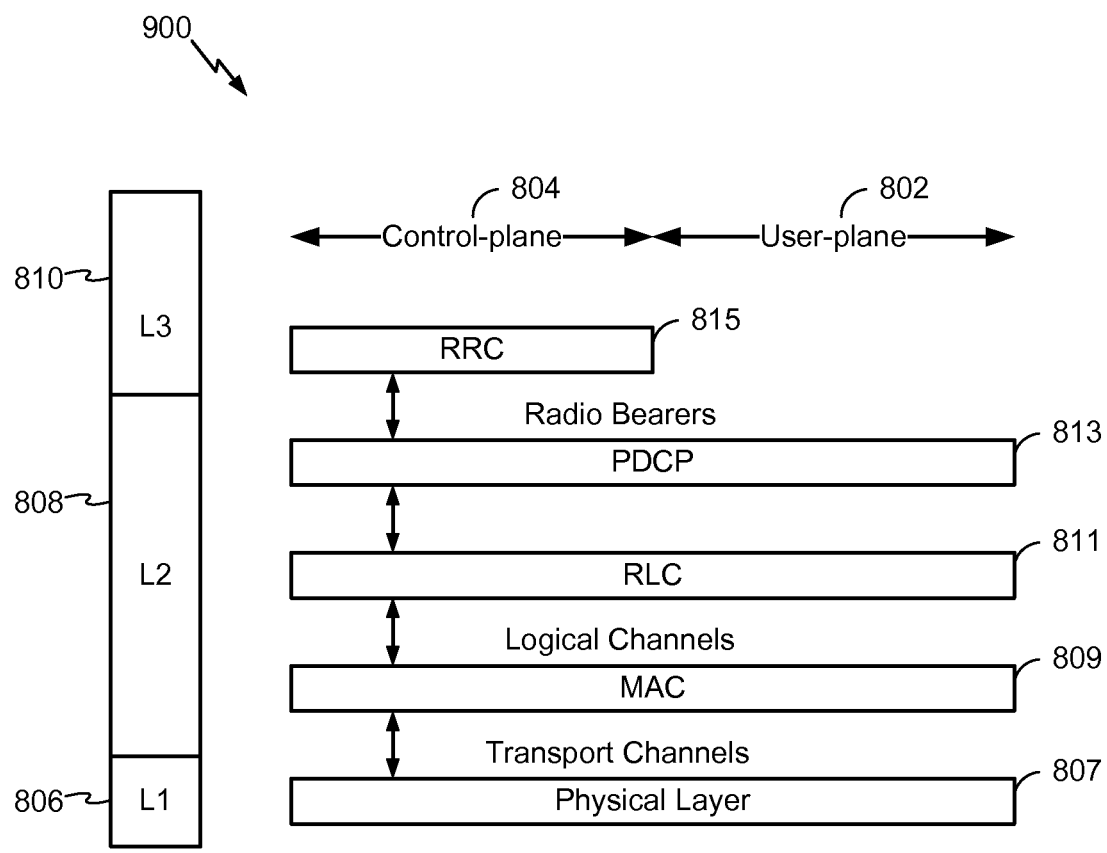
FIG. 9 is a conceptual diagram illustrating an example of a radio protocol architecture for the user and control planes for a base station and/or a UE, in accordance with an aspect of the present disclosure

FIG. 9 is a conceptual diagram illustrating an example of the radio protocol architecture 900 for the user plane 902 and the control plane 904 of a user equipment (UE) or NodeB/base station. The architecture 900 may be used with the networks described herein that include small cells having a PCI configuration manager 270. For example, architecture 900 may be included in a network entity and/or UE such as the ones described in FIGS. 1-4. The radio protocol architecture 900 for the UE and NodeB is shown with three layers: Layer 1 906, Layer 2 908, and Layer 3 910. Layer 1 906 is the lowest lower and implements various physical layer signal processing functions. As such, Layer 1 906 includes the physical layer 907. Layer 2 (L2 layer) 908 is above the physical layer 907 and is responsible for the link between the UE and NodeB over the physical layer 907. Layer 3 (L3 layer) 910 includes a radio resource control (RRC) sublayer 915. The RRC sublayer 915 handles the control plane signaling of Layer 3 between the UE and the UTRAN.

In the user plane, the L2 layer 908 includes a media access control (MAC) sublayer 909, a radio link control (RLC) sublayer 911, and a packet data convergence protocol (PDCP) 913 sublayer, which are terminated at the NodeB on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 913 provides multiplexing between different radio bearers and logical channels. The PDCP sublayer 913 also provides header compression for upper layer data packets to reduce radio transmission overhead, security by ciphering the data packets, and handover support for UEs between NodeBs. The RLC sublayer 911 provides segmentation and reassembly of upper layer data packets, retransmission of lost data packets, and reordering of data packets to compensate for out-of-order reception due to hybrid automatic repeat request (HARQ). The MAC sublayer 909 provides multiplexing between logical and transport channels. The MAC sublayer 909 is also responsible for allocating the various radio resources (e.g., resource blocks) in one cell among the UEs. The MAC sublayer 909 is also responsible for HARQ operations.

Figure 10:
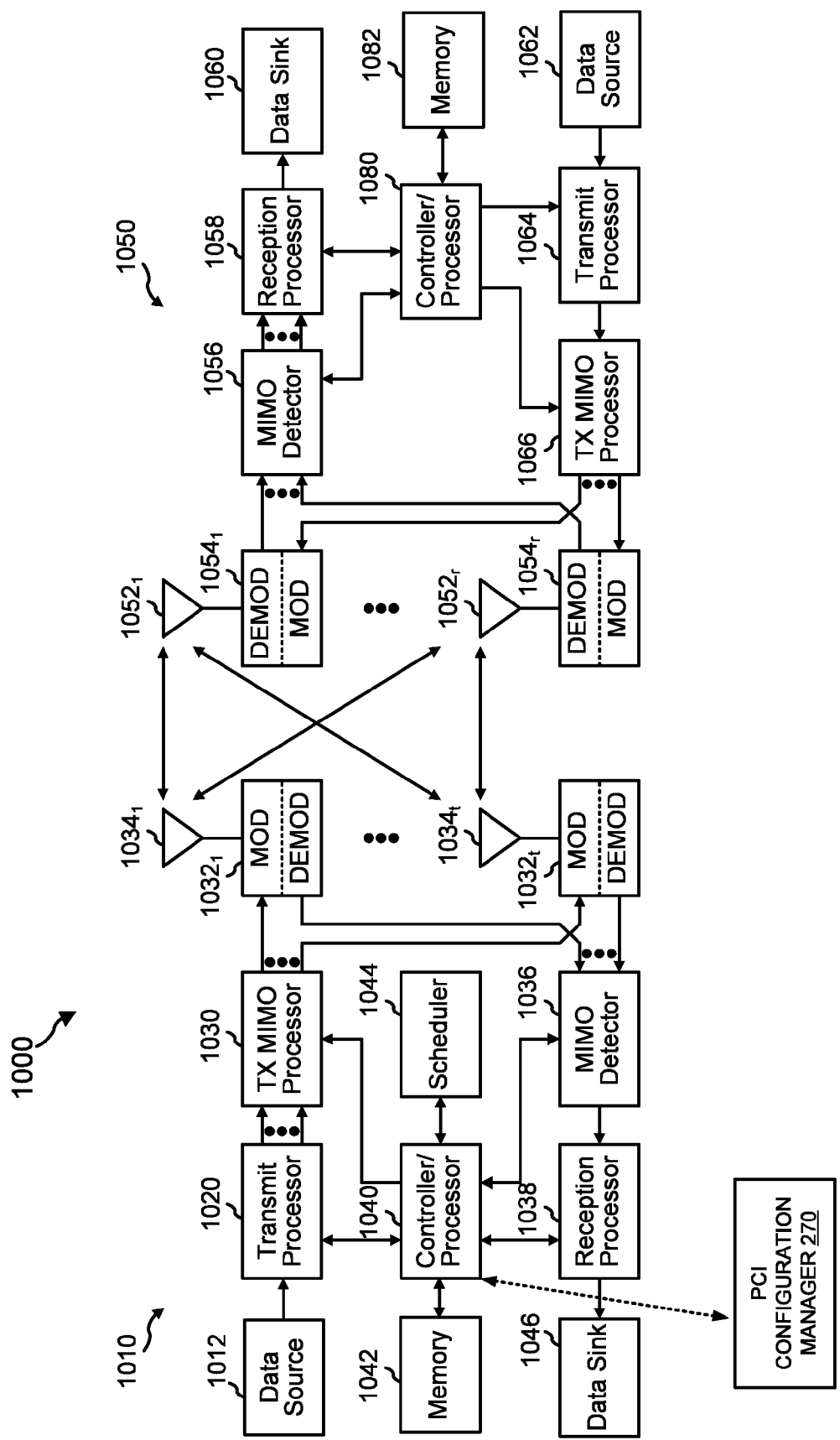
FIG. 10 is a block diagram conceptually illustrating examples of an eNodeB and a UE configured in accordance with an aspect of the present disclosure.

FIG. 10 is a block diagram 1000 conceptually illustrating examples of an eNodeB 1010 and a UE 1050 configured in accordance with an aspect of the present disclosure, wherein the eNodeB may be cell_3 250 of FIG. 2 that is configured to include PCI configuration manager 270. For example, the base station/eNodeB 10110 and the UE 1050 of a system 1000, as shown in FIG. 10, may be one of the base stations/eNodeBs and one of the UEs in FIGS. 1-4. The base station 1010 may be equipped with antennas $1034_{1-t}$, and the UE 1050 may be equipped with antennas $1052_{1-r}$, wherein t and r are integers greater than or equal to one.

At the base station 1010, a base station transmit processor 1020 may receive data from a base station data source 1012 and control information from a base station controller/processor 1040. The control information may be carried on the PBCH, PCFICH, PHICH, PDCCH, etc. The data may be carried on the PDSCH, etc. The base station transmit processor 1020 may process (e.g., encode and symbol map) the data and control information to obtain data symbols and control symbols, respectively. The base station transmit processor 1020 may also generate reference symbols, e.g., for the PSS, SSS, and cell-specific reference signal (RS). A base station transmit (TX) multiple-input multiple-output (MIMO) processor 1030 may perform spatial processing (e.g., precoding) on the data symbols, the control symbols, and/or the reference symbols, if applicable, and may provide output symbol streams to the base station modulators/demodulators (MODs/DEMODs) $1032_{1-t}$. Each base station modulator/demodulator 1032 may process a respective output symbol stream (e.g., for OFDM, etc.) to obtain an output sample stream. Each base station modulator/demodulator 1032 may further process (e.g., convert to analog, amplify, filter, and upconvert) the output sample stream to obtain a downlink signal. Downlink signals from modulators/demodulators $1032_{1-t}$ may be transmitted via the antennas $1034_{1-t}$, respectively.

At the UE 1050, the UE antennas $1052_{1-r}$ may receive the downlink signals from the base station 1010 and may provide received signals to the UE modulators/demodulators (MODs/DEMODs) $1054_{1-r}$, respectively. Each UE modulator/demodulator 1054 may condition (e.g., filter, amplify, downconvert, and digitize) a respective received signal to obtain input samples. Each UE modulator/demodulator 1054 may further process the input samples (e.g., for OFDM, etc.) to obtain received symbols. A UE MIMO detector 1056 may obtain received symbols from all the UE modulators/demodulators $1054_{1-r}$, and perform MIMO detection on the received symbols if applicable, and provide detected symbols. A UE reception processor 1058 may process (e.g., demodulate, deinterleave, and decode) the detected symbols, provide decoded data for the UE 1050 to a UE data sink 1060, and provide decoded control information to a UE controller/processor 1080.

On the uplink, at the UE 1050, a UE transmit processor 1064 may receive and process data (e.g., for the PUSCH) from a UE data source 1062 and control information (e.g., for the PUCCH) from the UE controller/processor 1080. The UE transmit processor 1064 may also generate reference symbols for a reference signal. The symbols from the UE transmit processor 1064 may be precoded by a UE TX MIMO processor 1066 if applicable, further processed by the UE modulator/demodulators $1054_{1-r}$ (e.g., for SC-FDM, etc.), and transmitted to the base station 1010. At the base station 1010, the uplink signals from the UE 1050 may be received by the base station antennas 1034, processed by the base station modulators/demodulators 1032, detected by a base station MIMO detector 1036 if applicable, and further processed by a base station reception processor 1038 to obtain decoded data and control information sent by the UE 1050. The base station reception processor 338 may provide the decoded data to a base station data sink 1046 and the decoded control information to the base station controller/processor 1040.

The base station controller/processor 1040 and the UE controller/processor 1080 may direct the operation at the base station 1010 and the UE 1050, respectively. The base station controller/processor 1040 and/or other processors and modules at the base station 1010 may perform or direct, e.g., the execution of the functional blocks illustrated in FIG. 2, various processes for the techniques described herein (e.g., flowchart illustrated in FIGS. 5, 6A, and 6B). The base station memory 1042 and the UE memory 1082 may store data and program codes for the base station 1010 and the UE 1050, respectively. A scheduler 1044 may be used to schedule UE 250 for data transmission on the downlink and/or uplink.

Figure 11:
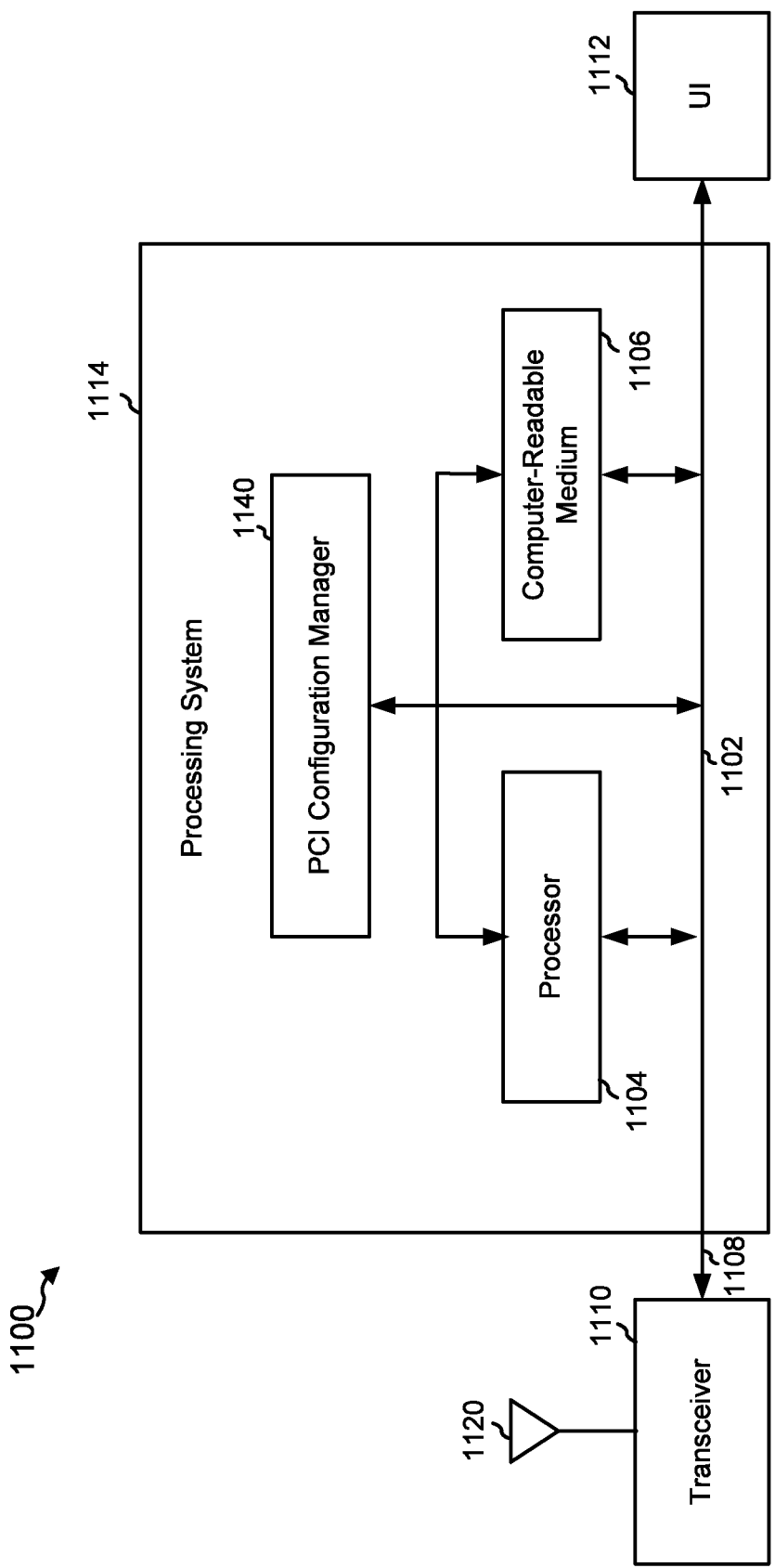
FIG. 11 is a block diagram conceptually illustrating an example hardware implementation for an apparatus employing a processing system configured in accordance with an aspect of the present disclosure.

FIG. 11 is a block diagram conceptually illustrating an example hardware implementation for an apparatus 1100 employing a processing system 1114 configured in accordance with an aspect of the present disclosure. The processing system 1114 includes a PCI configuration manager 1140 that may be an example of the PCI configuration manager 270 of FIG. 2. In one example, the apparatus 1100 may be the same or similar, or may be included with one of the eNodeBs of FIGS. 1-4. In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (e.g., central processing units (CPUs), microcontrollers, application specific integrated circuits (ASICs), field programmable gate arrays (FPGAs)) represented generally by the processor 1104, and computer-readable media, represented generally by the computer-readable medium 1106. The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110, which is connected to one or more antennas 1120 for receiving or transmitting signals. The transceiver 1110 and the one or more antennas 1120 provide a mechanism for communicating with various other apparatus over a transmission medium (e.g., over-the-air). Depending upon the nature of the apparatus, a user interface (UI) 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described herein for any particular apparatus (e.g., PCI configuration manager 270, cells 240 and 250). The computer-readable medium 1106 may also be used for storing data that is manipulated by the processor 1104 when executing software. The PCI configuration manager 1140 as described above may be implemented in whole or in part by processor 1104, or by computer-readable medium 1106, or by any combination of processor 1104 and computer-readable medium 1106.

The various concepts presented throughout this disclosure may be implemented across a broad variety of telecommunication systems, network architectures, and communication standards.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for self-configuring a physical cell identity (PCI) at a base station, comprising:
    detecting, at a first base station, that a PCI confusion exists at a second base station based on a message received from the second base station, wherein the message is a configuration update message or a X2 setup response message;
    initiating a timer at the first base station in response to detecting that the PCI confusion exists at the second base station, wherein the timer is selected from a first timer and a second timer, and wherein the first timer is longer in duration than the second timer;
    detecting whether the timer is reset or expired; and
    maintaining a current PCI for the first base station in response to detecting the timer is reset prior to expiration.

2. The method of claim 1, further comprising:
    selecting the timer based at least on a duration that the current PCI is in use by the first base station or a coverage area of the first base station.

3. The method of claim 2, wherein selecting the timer includes:
    comparing a time from a reboot of the first base station to a first threshold time value; and
    selecting the first timer as the timer when the time from the reboot of the first base station is greater than the threshold time value or selecting the second timer as the timer when the time from the reboot of the first base station is less than the first threshold time value.

4. The method of claim 2, wherein selecting the timer includes:
    comparing a time since the current PCI is in use by the first base station to a second threshold time value; and
    selecting the first timer as the timer when the time since the current PCI is in use by the first base station is greater than the second threshold time value, or the second timer as the timer when the time since the current PCI is in use by the first base station is less than the second threshold time value.

5. The method of claim 1, further comprising:
    receiving values of the first timer and the second timer from a home evolved NodeB (eNodeB) management system (HeMS).

6. The method of claim 1, wherein values of the first timer and the second timer are hardcoded at the first base station.

7. The method of claim 1, wherein the timer is the first timer and the message is a first message, the method further comprising:
    receiving a second message from the second base station, wherein the second message contains information that the PCI confusion at the second base station is resolved; and
    resetting the first timer in response to the information in the second message that the PCI confusion at the second base station is resolved.

8. The method of claim 1, wherein the first base station and a third base station are neighbors of the second base station, and wherein the first base station and the third base station have an overlapping have coverage overlapping with the third base station.

9. An apparatus for self-configuring a physical cell identity (PCI) at a base station, comprising:
    means for detecting, at a first base station, that a PCI confusion exists at a second base station based on a message received from the second base station, wherein the message is a configuration update message or a X2 setup response message;
    means for initiating a timer at the first base station in response to detecting that the PCI confusion exists at the second base station, wherein the timer is selected from a first timer and a second timer, and wherein the first timer is longer in duration than the second timer;
    means for detecting whether the timer is reset or expired; and
    means for maintaining a current PCI for the first base station in response to detecting the timer is reset prior to expiration.

10. The apparatus of claim 9, further comprising:
    means for selecting the timer based at least on a duration that the current PCI is in use by the first base station or a coverage area of the first base station.

11. The apparatus of claim 10, wherein means for selecting the timer includes:
    means for comparing a time from a reboot of the first base station to a first threshold time value; and
    means for selecting the first timer as the timer when the time from the reboot of the first base station is greater than the first threshold time value or means for selecting the second timer as the timer when the time from the reboot of the first base station is less than the first threshold time value.

12. The apparatus of claim 10, wherein means for selecting the timer includes:
    means for comparing a time since the current PCI is in use by the first base station to a second threshold time value; and
    means for selecting the first timer as the timer when the time since the current PCI is in use by the first base station is greater than the second threshold time value, or the second timer as the timer when the time since the current PCI is in use by the first base station is less than the second threshold time value.

13. The apparatus of claim 9, further comprising:
    means for receiving values of the first timer and the second timer from a home evolved NodeB (eNodeB) management system (HeMS).

14. The apparatus of claim 9, wherein values of the first timer and the second timer are hardcoded at the first base station.

15. The apparatus of claim 9, wherein the timer is the first timer and the message is a first update message, the apparatus further comprising:

means for receiving a second message from the second base station, wherein the second message contains information that the PCI confusion at the second base station is resolved; and means for resetting the first timer in response to the information in the second message that the PCI confusion at the second base station is resolved.

16. The apparatus of claim 9, wherein the first base station and a third base station are neighbors of the second base station, and wherein each of the first base station and the third base station have coverage overlapping with the third base station.

17. A non-transitory computer readable medium for storing computer executable code for self-configuring a physical cell identity (PCI) at a base station, comprising:

code for detecting, at a first base station, that a PCI confusion exists at a second base station based on a message received from the second base station, wherein the message is a configuration update message or a X2 setup response message;

code for initiating a timer at the first base station in response to detecting that the PCI confusion exists at the second base station, wherein the timer is selected from a first timer and a second timer, the first timer longer in duration than the second timer;

code for detecting whether the timer is reset or expired; and code for or maintaining a current PCI for the first base station in response to detecting the timer is reset prior to expiration.

18. The computer readable medium of claim 17, further comprising:

code for selecting the timer based at least on a duration that the current PCI is in use by the first base station or a coverage area of the first base station.

19. The computer readable medium of claim 18, wherein the code for selecting the timer includes:

code for comparing a time from a reboot of the first base station to a first threshold time value; and code for selecting the first timer as the timer when the time from the reboot of the first base station is greater than the threshold time value or selecting the second timer as the timer when the time from the reboot of the first base station is less than the first threshold time value.

20. The computer readable medium of claim 18, wherein the code for selecting the timer includes:

code for comparing a time since the current PCI is in use by the first base station to a second threshold time value; and code for selecting the first timer as the timer when the time since the current PCI is in use by the first base station is greater than the second threshold time value, or the second timer as the timer when the time since the current PCI is in use by the first base station is less than the second threshold time value.

21. The computer readable medium of claim 17, further comprising:

code for receiving values of the first timer and the second timer from a home evolved NodeB (eNodeB) management system (HeMS).

22. The computer readable medium of claim 17, wherein values of the first timer and the second timer are hardcoded at the first base station.

23. An apparatus for configuring a physical cell identity (PCI) at a base station, comprising:

a processor and a memory, the processor and the memory configured to:

detect, at a first base station, that a PCI confusion exists at a second base station based on a message received from the second base station, wherein the message is a configuration update message or a X2 setup response message;

initiate a timer at the first base station in response to detecting that the PCI confusion exists at the second base station, wherein the timer is selected from a first timer and a second timer, and wherein the first timer is longer in duration than the second timer;

detect whether the timer is reset or expired; and maintain a current PCI for the first base station in response to detecting the timer is reset prior to expiration.

24. The apparatus of claim 23, wherein the processor is further configured to select the timer based at least on a duration that the current PCI is in use by the first base station or a coverage area of the first base station.

25. The apparatus of claim 24, wherein the processor is further configured to:

compare a time from a reboot of the first base station to a first threshold time value; and select the first timer as the timer when the time from the reboot of the first base station is greater than the first threshold time or select the second timer as the timer when the time from the reboot of the first base station is less than the first threshold time value.

26. The apparatus of claim 24, wherein the processor is further configured to:

compare a time since the current PCI is in use by the first base station to a second threshold time value; and select the first timer as the timer when the time since the current PCI is in use by the first base station is greater than the second threshold time value, or the second timer as the timer when the time since the current PCI is in use by the first base station is less than the second threshold time value.

27. The apparatus of claim 23, wherein the processor is further configured to receive the first timer and the second timer from a home evolved NodeB (eNodeB) management system (HeMS).

28. The apparatus of claim 23, wherein values of the first timer and the second timer are hardcoded at the first base station.

29. The apparatus of claim 23, wherein the timer is the first timer and the message is a first message, and the processor is further configured to:

receive a second message from the second base station, wherein the second message contains information that the PCI confusion at the second base station is resolved; and reset the first timer in response to the information in the second message that the PCI confusion at the second base station is resolved.

30. The apparatus of claim 23, wherein the first base station and a third base station are neighbors of the second base station, and wherein each of the first base station and the third base station has an overlapping coverage with the third base station.

31. The method of claim 1, further comprising:

configuring a new PCI for the first base station in response to detecting expiration of the timer.

32. The apparatus of claim 9, further comprising:

means for configuring a new PCI for the first base station in response to detecting expiration of the timer.

33. The computer readable medium of claim 17, further comprising:

code for configuring a new PCI for the first base station in response to detecting expiration of the timer.

34. The apparatus of claim 23, wherein the processor is further configured to:
configure a new PCI for the first base station in response to detecting expiration of the timer.

* * * * *